United States Patent [19]

Emori

[11] Patent Number: 5,158,149
[45] Date of Patent: Oct. 27, 1992

[54] STEERING FORCE CONTROL APPARATUS FOR POWER STEERING SYSTEM

[75] Inventor: Yasuyoshi Emori, Saitama, Japan
[73] Assignee: Jidosha Kiki Co., Ltd., Saitama, Japan
[21] Appl. No.: 815,842
[22] Filed: Dec. 30, 1991

Related U.S. Application Data

[63] Continuation of Ser. No. 480,870, Feb. 16, 1990, abandoned.

[30] Foreign Application Priority Data

Feb. 17, 1989 [JP] Japan .................. 1-36367
Feb. 17, 1989 [JP] Japan .................. 1-36368

[51] Int. Cl.$^5$ .............................................. B62D 5/06
[52] U.S. Cl. ........................................................ 180/143
[58] Field of Search ................................ 180/141, 143

[56] References Cited

U.S. PATENT DOCUMENTS

| | | | |
|---|---|---|---|
| 2,487,618 | 11/1949 | Twyman | 180/143 |
| 3,693,747 | 9/1972 | Nishikawa | 180/143 |
| 3,744,515 | 7/1973 | Inoue | 180/143 |
| 4,000,785 | 1/1977 | Nishikawa et al. | 180/143 |
| 4,034,825 | 7/1977 | Adams | 180/143 |
| 4,119,172 | 10/1978 | Yangishima et al. | 180/141 |
| 4,293,051 | 10/1981 | Nishikawa | 180/143 X |
| 4,557,344 | 12/1985 | Lang | 180/143 |
| 4,664,210 | 5/1987 | Yamaoka et al. | 180/141 |

FOREIGN PATENT DOCUMENTS 61-105273  5/1986  Japan .
61-132466  6/1986  Japan .

Primary Examiner—Charles A. Marmor
Assistant Examiner—Kevin Hurley
Attorney, Agent, or Firm—Blakely, Sokoloff, Taylor & Zafman

[57] ABSTRACT

A steering force control apparatus for a power steering system includes a valve. The valve includes a valve hole, a spool, and a spring. A main pump oil supply path branched from a main hydraulic path extending from a pump to a power cylinder, a reaction path connected to a hydraulic reaction chamber, and a discharge path connected to a tank are open to the valve hole to be spaced apart from each other by predetermined distances along an axis of the valve. The spool is slidably arranged in the valve hole and has land portions so as to change connecting states of the main pump oil supply path, the reaction path, and the discharge path. The spring always biases the spool in one direction. A sub-pump oil supply path for supplying a fluid from a sub-pump whose delivery pressure is changed is connected to an end of the spool which is biased by the spring, thereby controlling an operation of the spool by the subpump in correspondence with a vehicle speed.

9 Claims, 2 Drawing Sheets

STEERING FORCE CONTROL APPARATUS FOR POWER STEERING SYSTEM1

This is a continuation of application Ser. No. 07/480,870 filed Feb. 16, 1990, abandoned.

BACKGROUND OF THE INVENTION

The present invention relates to an improvement of a steering force control apparatus including a hydraulic reaction mechanism suitable for a speed response type power steering system.

Various conventional speed response type steering force control apparatuses for causing hydraulic reaction mechanisms to perform steering force control in correspondence with traveling speeds (vehicle speeds) of a vehicle have been proposed for power steering systems for increasing a steering wheel operating force (steering force) of a vehicle. More specifically, during parking or low-speed traveling, a reaction oil pressure is minimized to allow a steering operation with a small force. However, during high-speed traveling, the reaction oil pressure is increased to make the steering wheel stiff to improve stability during straight traveling. In this manner, steering force control is performed such that input and output shafts of the power steering system arc pivoted relatively to each other or constrained by a reaction piston for selectively constraining input and output shafts of the power steering system in accordance with a magnitude of the reaction oil pressure.

A typical steering force control apparatus of this type is disclosed in Japanese Patent Laid-Open Nos. 61-105273 and 61-132466, Japanese Utility Model Laid-Open No. 62-25265, and Japanese Patent Laid-Open No. 63-68467, wherein a reaction oil pressure is branched from part of a main hydraulic path extending from a pump to a power cylinder through a flow path selector valve, and this partial oil pressure is controlled by a reaction oil pressure control valve, e.g., a valve, and supplied to a hydraulic reaction chamber to move a reaction piston.

As described in the above prior art control apparatuses, a drive source for driving a control mechanism for controlling a reaction oil pressure transmitted to the hydraulic reaction chamber in accordance with the vehicle speed is generally constituted by electrical actuators such as a solenoid coil and a stepping motor for generating a predetermined operating force by using an output current from a controller in accordance with a detection signal from a vehicle speed sensor. In this speed response type steering force control apparatus of an electronic control system, however, the controller using a microcomputer or the like having a converter for converting the detection signal from the vehicle speed sensor into a current output is required, in addition, the electrical actuators such as a solenoid coil and a stepping motor driven by the output current are also required to inevitably result in high cost. Furthermore, a countermeasure against disturbance such as electromagnetic interference must be provided to assure stable control of the controller, thus further increasing the cost.

Another conventional steering force control apparatus of a hydraulic control system is also proposed as in Japanese Utility Model Publication No. 61-32851. This steering force control apparatus comprises a speed response type hydraulic pump whose delivery flow rate is changed in accordance with a change in vehicle speed, and a valve of a hydraulic control system having a spool which is operated in accordance with the delivery flow rate of the hydraulic pump to control a reaction oil pressure transmitted to a hydraulic reaction chamber. In this conventional apparatus, the spool is driven and controlled by increasing the delivery flow rate of the pump and utilizing a pressure difference between the upstream and downstream pressures of a stationary restrictor arranged in the path in the spool. At the same time, a reaction oil pressure delivered from the upstream side of the stationary restrictor is supplied to the hydraulic reaction chamber through a reaction path. A high flow rate is required to control and supply the oil pressure delivered from the speed response type pump to the hydraulic reaction chamber. As a result, a large pump is required, and the apparatus as a whole becomes bulky. Strong demand has arisen for providing an effective countermeasure for solving al the conventional problems.

In addition, in the steering force control apparatus using a hydraulic reaction mechanism of this type, the hydraulic reaction force must be proportionally controlled to have characteristics enough to obtain a steering force required in accordance with a vehicle speed and a steering condition. These problems are also taken into consideration.

SUMMARY OF THE INVENTION

It is an object of the present invention to provide a steering force control apparatus for a power steering system, free from an influence of disturbance such as electromagnetic interference (EMI) and capable of being operated with high precision.

It is another object of the present invention to provide a steering force control apparatus for a power steering system wherein a reaction control valve and its drive source can be made compact and total cost can be reduced.

In order to achieve the above objects of the present invention, there is provided a steering force control apparatus for a power steering system, comprising a valve having a valve hole to which a main pump oil supply path branched from a main hydraulic path extending from a pump to a power cylinder, a reaction path connected to a hydraulic reaction chamber, and a discharge path connected to a tank are open to be spaced apart from each other by predetermined distances along an axis of the valve, a spool slidably arranged in the valve hole and having land portions so as to change connecting states of the main pump oil supply path, the reaction path, and the discharge path, and biasing means for always biasing the spool in one direction, wherein a subpump oil supply path for supplying a fluid from a subpump whose delivery pressure is changed is connected to an end of the spool which is biased by the biasing means, thereby controlling an operation of the spool by the subpump in correspondence with a vehicle speed.

According to the basic principle of the present invention, therefore, the reaction pressure control valve is arranged in the flow path extending to the hydraulic reaction chamber to supply part of the pressurized oil from the main pump. The speed response type pump (a compact pump can be used) whose delivery amount is changed in accordance with a change in vehicle speed is used as a subpump serving as a drive source for controlling the reaction control valve. Movement of the spool is changed in accordance with the vehicle speed. Reaction control of the reaction chamber is performed by a function of a restrictor controlled to be opened/closed upon movement of the spool.

In the valve serving as the reaction pressure control valve, movement of the spool together with the subpump is fed back using a reaction pressure. The rise characteristics (rise characteristics of the input torque) can be proportionally controlled by using this reaction pressure, thereby achieving more practical control.

The speed response type motor can be a compact pump driven by a transmission output shaft, a compact pump of an automatic transmission, or a compact pump arranged at an outlet port of a speedometer cable.

DESCRIPTION OF THE PREFERRED EMBODIMENTS

Figure 1:
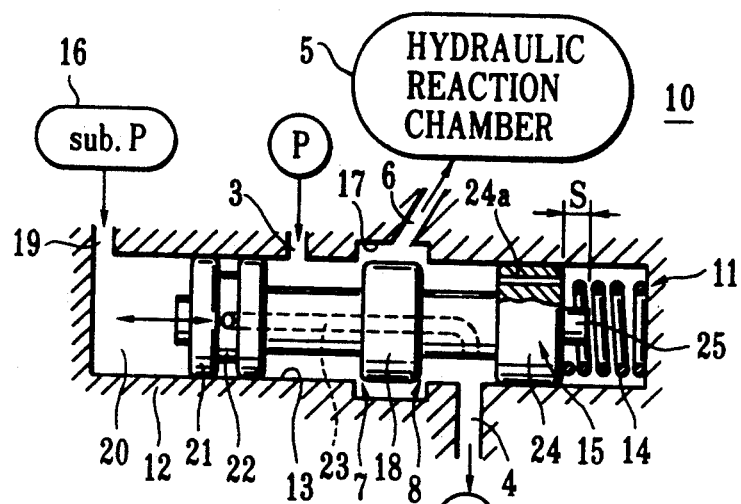
FIG. 1 is a sectional view of a main part of a hydraulic reaction control valve structure as a characteristic feature of a steering force control apparatus for a power steering system according to an embodiment of the present invention.
Figure 2:
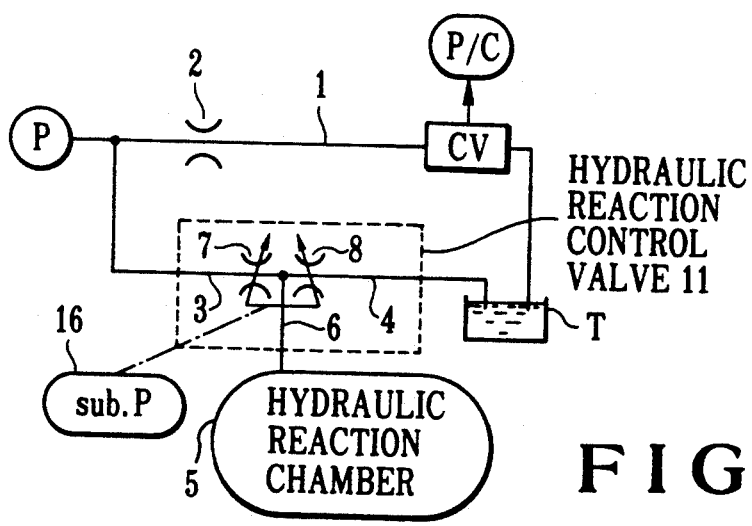
FIG. 2 is a hydraulic circuit diagram of the power steering system to explain the steering force control apparatus.

FIGS. 1 and 2 show an embodiment of a steering force control apparatus for a power steering system according to an embodiment of the present invention. Referring to FIGS. 1 and 2, a schematic structure of a hydraulic circuit in the power steering system will be briefly described with reference to FIG. 2. A pressurized oil delivered from a main pump P for supplying it to a power cylinder (denoted by P/C) serving as an apparatus actuator passes in a main hydraulic path 1 through a control valve CV for selectively performing hydraulic control of the right and left chambers of the power cylinder P/C in accordance with a steering direction and a steering angle upon a steering operation and is returned to a tank T, as is well-known to those skilled in the relevant art. A path 3 for supplying part of the pressurized oil is branched from a portion between the main hydraulic path 1 and a stationary orifice 2 arranged on the upstream side of the control valve CV. A hydraulic reaction control mechanism 10 constituting a steering force control apparatus as a characteristic feature of the present invention is arranged midway along the supply path 3. The supply path 3 is connected to the tank T through a discharge path 4, and a reaction path 6 extending to the hydraulic reaction chamber 5 is branched from a portion between the supply path 3 and the discharge path 4. Reference numerals 7 and 8 denote variable restrictors arranged in a valve (FIG. 1) serving as a hydraulic reaction control valve constituting the hydraulic reaction control mechanism 10. The reaction path 6 is connected between the variable restrictors 7 and 8.

According to the characteristic feature of the present invention, the hydraulic reaction control mechanism 10 serving as the steering force control apparatus comprises a hydraulic reaction control valve 11 having a valve hole 13 and a spool 15. The valve hole 13 is formed in a valve body 12. The supply path 3 for supplying part of the pressurized oil from the main pump P and the discharge path 4 connected to the tank T are spaced apart from each other by a predetermined distance in the axial direction and are open to the valve hole 13. The reaction path 6 located between the paths 3 and 4 and extending to the hydraulic reaction chamber 5 is open to the valve hole 13. The spool 15 is slidably supported and biased by a coil spring 14 in the valve hole 13 in one direction and variably controls connecting states of openings of the paths 3, 6, and 4 upon movement of the spool 15. A driving means for moving the spool 15 of the valve 11 in the valve hole 13 against the biasing force is a fluid pressure from a subpump (denoted by sub.P) 16 whose delivery pressure is changed in accordance with a change in vehicle speed.

Reference numeral 17 denotes an annular groove recessed and located between openings of the supply path 3 and the discharge path 4 in the valve hole 13. The reaction path 6 is open to the annular groove 17. Reference numeral 18 denotes a land portion formed on the spool 15 at a position opposite to the annular groove 17. Both sides of the land portion 18 along the axial direction constitute the variable restrictors 7 and 8 together with both edges of the annular groove 17. Reference numeral 19 denotes a path for connecting the subpump 16 to a chamber 20 opposite to the coil spring 14 in the valve hold 13. A land portion 21 at the end portion of the spool 15 at a position opposite to the chamber 20 has a distal end formed to have a slight clearance from the valve hole 13. At the same time, a discharge path or escape hole 23 is formed inside the spool 15. An annular groove 22 is formed to discharge a leaking oil to the discharge path 4 through the escape hole 23 formed in the spool 15. That is, when the spool 15 is moved to the right in the valve hold 13 by a maximum stroke, part of the oil is returned to the tank T so as to prevent a pressure increase exceeding a necessary pressure, thus constituting a kind of relief valve.

Figure 3:
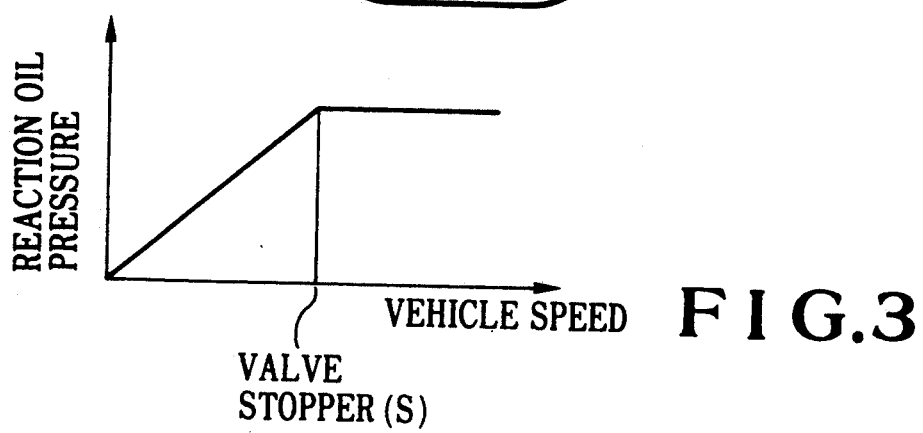
FIG. 3 is a graph showing a relationship between a vehicle speed and a reaction oil pressure according to the present invention.

A leakage hole 24a is formed in a land portion 24 at the other end of the spool 15. A valve stopper 25 is formed at the corresponding end of the spool 15 to limit movement of the spool 15 by a projection amount of the stopper 25. When a vehicle speed exceeds a predetermined speed, movement of the spool 15 is limited and the reaction oil pressure is maintained at a predetermined value. This is apparent from the graph shown in FIG. 3. That is, in a high-speed traveling at a speed exceeding the predetermined speed, a maximum hydraulic reaction force is applied to allow steering close to almost manual steering.

With the above arrangement, the hydraulic reaction control valve 11 is operated by the simple, portable speed response type subpump 16 whose delivery fluid pressure is changed in accordance with the vehicle speed. The subpump 16 can be exemplified by a compact pump driven by a transmission output shaft, a compact pump of an automatic transmission, or a compact pump mounted at the outlet port of a speedometer cable. Part of the pressurized oil from the main pump P for the apparatus actuator is selectively supplied to the hydraulic reaction chamber 5 as a reaction oil pressure to obtain a required steering reaction force, thereby appropriately performing a steering operation with a steering force suitable for a vehicle speed.

With the above arrangement, therefore, since the simple speed response type subpump 16 is used as a spool drive source for the hydraulic reaction control valve 11 for hydraulic reaction control, the hydraulic reaction control valve 11 having high reliability can be easily and appropriately operated. Expensive components such as a solenoid coil and a stepping motor which are conventionally used can be omitted. Conventional components (e.g., a vehicle speed sensor and a controller) which tend to be adversely affected by disturbance such as an electromagnetic interference can be omitted, and the highly reliable hydraulic reaction control mechanism 10 can be obtained at low cost. In addition, part of the pressurized oil from the main pump for apparatus actuator is selectively supplied to the hydraulic reaction chamber 5 as a reaction oil pressure. A desired steering reaction force can be obtained, and the steering operation can be appropriately performed with a steering force corresponding to the vehicle speed. The reaction control operation of the hydraulic reaction control mechanism 10 of this type, the structure of the power steering system including the hydraulic reaction chamber 5 and the like, and their relationship are known to those skilled in the art, and a detailed description thereof will be omitted.

The present invention is not limited to the particular embodiment described above. Various changes and modifications of the shapes, structures and the like of the respective components can be made within the spirit and scope of the invention.

The steering force control apparatus for the power steering system according to the above embodiment comprises a hydraulic reaction control valve having the valve hole and the spool. The supply path for supplying part of the pressurized oil from the main pump and the discharge path connected to the tank are spaced apart from each other by a predetermined distance in the axial direction and are open to the valve hole. The reaction path located between the supply and discharge paths and extending to the hydraulic reaction chamber is also open to the valve hole. The spool is slidably supported and biased by a coil spring in the valve hole in one direction and variably controls connecting states of openings of the supply, discharge, and reaction paths upon movement of the spool. A driving means for moving the spool of the valve in the valve hole against the biasing force is a fluid pressure from a subpump whose delivery pressure is changed in accordance with a change in vehicle speed. Therefore, the structure is a compact pump driven by the transmission output shaft, a compact pump of an automatic transmission, or a compact pump mounted at an outlet port of a speedometer cable can be used as a speed response type subpump whose delivery fluid pressure can be changed in accordance with a change in vehicle speed. A highly reliable hydraulic reaction control valve can be easily and appropriately operated. Expensive components such as a solenoid and a stepping motor can be omitted. The apparatus as a whole can be made compact. In addition, conventional components (e.g., a vehicle speed sensor and a controller) which tend to be adversely affected by disturbance such as electromagnetic interference can be omitted, and a highly reliable reaction oil pressure control means can be obtained at low cost. Part of the pressurized oil from the main pump for apparatus actuator is selectively supplied to the hydraulic reaction chamber as a reaction oil pressure by the valve. A desired steering reaction force can be obtained to appropriately perform a steering operation with a steering force corresponding to a vehicle speed.

Figure 4:
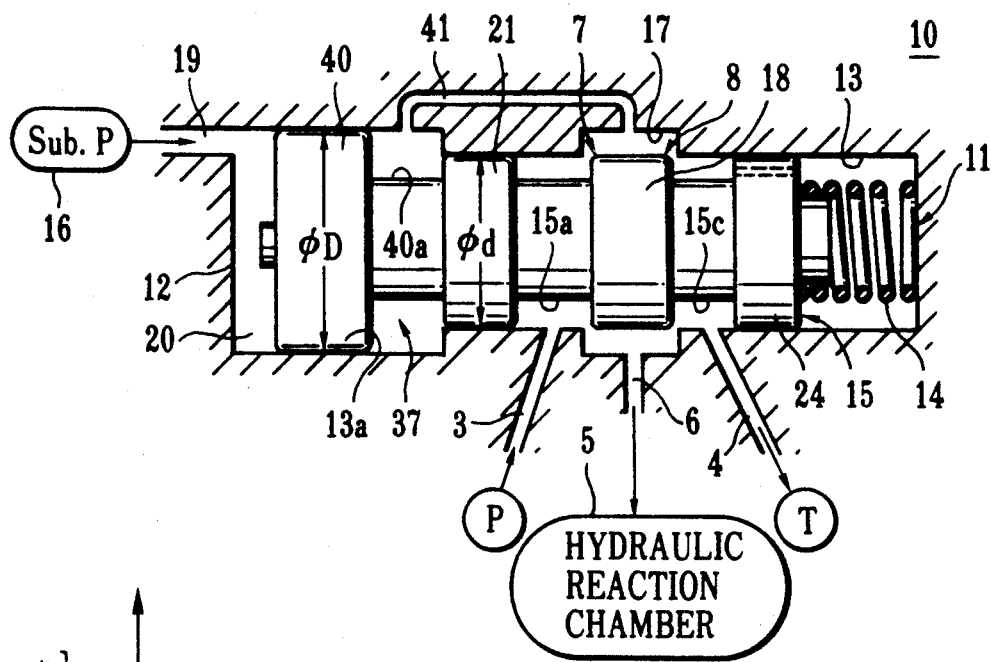
FIG. 4 is a sectional view showing a main part of a hydraulic reaction control valve structure as a characteristic feature of a steering force control apparatus for a power steering system according to another embodiment of the present invention.

FIG. 4 shows a steering force control apparatus for a power steering system according to another embodiment of the present invention. The same reference numerals as in FIG. 1 denote the same parts in FIG. 4.

According to the characteristic feature of this embodiment, a hydraulic reaction control mechanism 10 serving as the steering force control apparatus comprises a hydraulic reaction control valve 11 having a valve hole 13 and a spool 15. The valve hole 13 is formed in a valve body 12. The supply path 3 for supplying part of the pressurized oil from a main pump P and a discharge path 4 connected to the tank T are spaced apart from each other by a predetermined distance in the axial direction and are open to the valve hole 13. A reaction path 6 located between the paths 3 and 4 and extending to the hydraulic reaction chamber 5 is open to the valve hole 13. The spool 15 is slidably supported and biased by a coil spring 14 located on the right end of FIG. 4 in the valve hole 13 in the left direction (FIG. 4) and variably controls connecting states of openings of the paths 3, 6, and 4 upon movement of the spool 15. A driving means for moving the spool 15 of the valve 11 in the valve hole 13 against the biasing force s a fluid pressure from a subpump (denoted by sub.P) 16 whose delivery pressure is changed in accordance with a change n vehicle speed. In addition, a feedback chamber 37 for receiving the reaction oil pressure supplied to the hydraulic reaction chamber 5 is located at a position opposite to the other chamber (left spool chamber) 20 as part of the spool 15 in the valve hole 13 which receives a fluid pressure from the subpump 16.

A land portion 18 and a land portion 40 having a larger diameter than those of outer land portions 21 and 24 of annular grooves 15a and 15b of openings of the paths 3 and 4 at both sides of the land 18 are formed at the end of the spool 15 at the position opposite to the chamber 20. The land portion 40 and a large diameter hole 13a formed at the right end of the valve hole 13 define the chamber 20 which receives a fluid pressure from the subpump 16.

An annular hole 40a is formed in the large-diameter hole 13a at a position closer to the inner portion of the spool 15 than the land 40, thereby forming the feedback chamber 37 which receives through a path 41 the reaction oil pressure from an annular groove 17 to which the reaction path 6 is open. The feedback chamber 37 opposes the left chamber 20 of the spool 15 through the land portion 40. If the diameter of the land portion 40 is defined as D, and the diameter of each of the remaining land portions 21, 18, and 24 of the spool 15 is defined as d, condition D>d is satisfied. With this arrangement, a fluid pressure is applied from the subpump 16 to the chamber 20 of the spool 15 to exert a given force to the right (FIG. 4). A biasing force of the coil spring 14 and a reaction hydraulic pressure acting on the feedback chamber 37 serve as a composite reaction force against the given force. It is readily understood that forces (e.g., a force generated by a pressure difference) other than the above forces are balanced on the spool 15.

Figure 5:
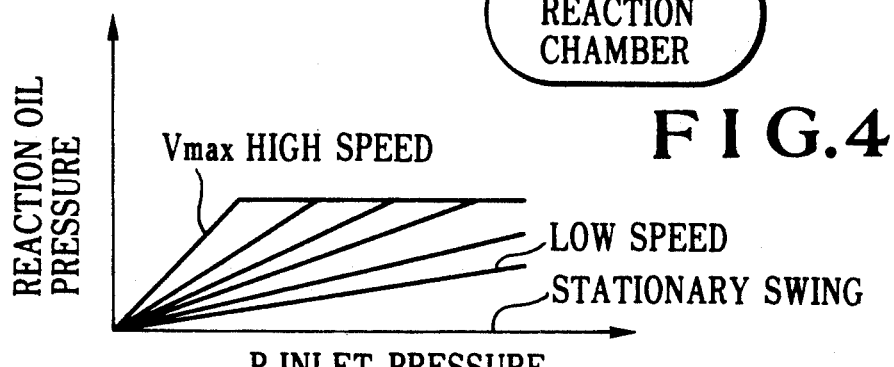
FIG. 5 is a graph showing a relationship between a P inlet pressure and a reaction oil pressure corresponding to a vehicle speed.
Figure 6:
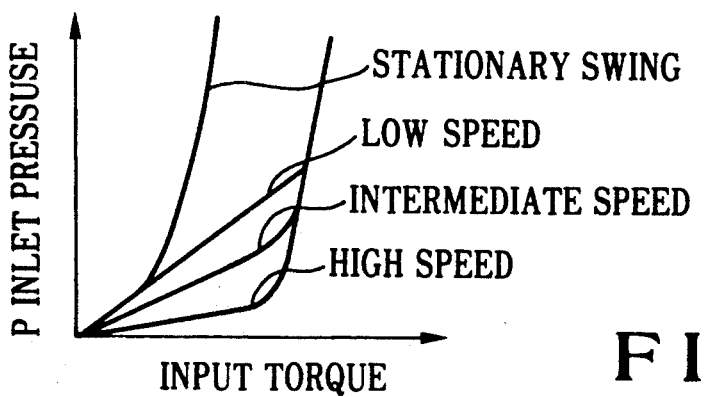
FIG. 6 is a graph showing a relationship between the P inlet pressure and an input torque.

With the above arrangement, when the vehicle speed is changed from a low speed to a high speed, the fluid pressure from the subpump 16 becomes a high pressure, and a force against the biasing force acts on the land portion 18a of the spool 15. A pressurized oil from the main pump P is supplied to the hydraulic reaction chamber 5 through an open variable restrictor 7 along the reaction path 6. Therefore, a desired steering reaction force is obtained to allow steering close to almost manual steering with a corresponding steering force. The reaction oil pressure for obtaining this steering reaction force has a characteristic curve which is steep upon a change in vehicle speed to a high speed and is saturated with a predetermined value. According to this embodiment, the feedback chamber 37 is formed at an inner position of the spool 15 to supply the reaction oil pressure. A composite force of the pressure of the chamber 37 and the biasing force of the coil spring 14 acts as a force against the fluid pressure from the subpump 16. The rise characteristics up to the maximum hydraulic reaction torque can be proportionally controlled. Reaction hydraulic pressures for obtaining steering reaction forces in low-, intermediate-, and high-speed traveling states can be controlled in a more practical way. This can be easily understood from the graph in FIG. 5. When the above-mentioned feedback control is performed, rise characteristics required in correspondence with input torques, i.e., steering torques during stationary swing or low-speed traveling can be obtained, as shown in FIG. 6. A moderate rise characteristic curve is obtained during high-speed traveling. When the input torque reaches a predetermined value or more, the rise characteristic curve becomes abruptly steep, thereby assuring a necessary auxiliary steering force.

According to this embodiment, movement of the spool is feedback-controlled by the hydraulic reaction force, and the reaction oil pressure proportionally controlled in correspondence with changes in vehicle speed and changes in steering conditions can be obtained, thereby performing desired steering force control, thus providing a remarkable practical advantage.

What is claimed is:

1. A steering force control apparatus for a power steering system comprising a valve having: a valve hole to which a main pump oil supply path branched from a main hydraulic path extending from a pump to a power cylinder, a reaction path connected to a hydraulic reaction chamber, and a discharge path connected to a tank are open to be spaced apart from each other by predetermined distances along an axis of said valve; a spool slidably arranged in said valve hole and having land portions so as to change connecting states of said main pump oil supply path, said reaction path, and said discharge path; and biasing means for always biasing said spool in one direction, wherein a subpump oil supply path for supplying a fluid from a subpump whose delivery pressure is changed in response to a vehicle speed is connected to an end of said spool which is biased by said biasing means, said spool is driven against said biasing means by supplying a pressure corresponding to vehicle speed, hydraulic pressure branched from said main hydraulic path in accordance with said spool displacement is decreased by variable restrictors formed in said spool and supplied to said hydraulic reaction chamber, and a portion of said hydraulic pressure is supplied to a chamber located between said spool and said valve hole, thereby controlling hydraulic reaction pressure by displacing said spool in the direction against said pressure corresponding to said vehicle speed, said spool includes a central land portion and two end land portions, and one of said main pump oil supply path and said discharge path is located between said central land portion and said two end land portions, said central land portion being arranged to control a reaction oil pressure by changing restrictors formed at both sides of an annular path connected to said reaction path of said valve hole in accordance with a change in delivery pressure from said subpump through said subpump oil supply path, the delivery pressure corresponding to the vehicle speed, and one of said end land portions on a subpump oil supply path side has another annular path which communicates with said discharge path through an escape path formed in said spool.

2. An apparatus according to claim 1, wherein one of said end land portions on a biasing means side has an escape path.

3. An apparatus according to claim 1, wherein said end of said spool which is biased by said biasing means has a valve stopper.

4. A steering force control apparatus for a power steering system comprising a valve having; a valve hole to which a main pump oil supply path branching from a main hydraulic path extending from a pump to a power cylinder, a reaction path connected to a hydraulic reaction chamber, and a discharge path connected to a tank are open to be spaced apart from each other by predetermined distances along an axis of said valve; a spool slidably arranged in said valve hole and having land portions so as to change connecting states of said main pump oil supply path, said reaction path, and said discharge path; and biasing means for always biasing said spool in one direction, wherein a subpump oil supply path for supplying a fluid from a subpump whose delivery pressure is changed in response to a vehicle speed is connected to an end of said spool which is biased by said biasing means, said spool is driven against said biasing means by supplying a pressure corresponding to vehicle speed, hydraulic pressure branching from said main hydraulic path in accordance with said spool displacement is decreased by variable restrictors formed in said spool and supplied to said hydraulic reaction chamber, and a portion of said hydraulic pressure is supplied to a chamber located between said spool and said valve hole, thereby controlling hydraulic reaction pressure by displacing said spool in the direction against said pressure corresponding to said vehicle speed, wherein said valve hole has an annular groove and said spool includes four land portions, said four land portions are located in an order of first, second, third and fourth land portions from a chamber to which said subpump oil supply path is connected, said first land portion and said second land portion define a chamber that is in fluid communication with said hydraulic reaction chamber, said main pump oil supply path is located between said second land portion and said third land portion, said discharge path is located between said third land portion and said fourth land portion, said biasing means for biasing said spool normally in one direction is located outside said fourth land portion, and two restrictors are formed at both sides of said third land portion corresponding to said annular groove which is in fluid communication with said reaction path, thereby controlling hydraulic reaction pressure by changing said restrictors in accordance with pressure corresponding to said vehicle speed.

5. An apparatus according to claim 4, wherein a passage which communicates with said annular groove is connected to said chamber to which a pressure to said hydraulic reaction chamber is supplied, thereby controlling hydraulic reaction force to achieve a feedback operation on the basis of hydraulic reaction pressure supplied to said chamber.

6. An apparatus according to claim 5, wherein said first land portion at the side of said subpump oil supply path has a diameter larger than that of any other land portions.

7. A steering force control apparatus for a power steering system comprising a valve having: a valve hole to which a main pump oil supply path branching from a main hydraulic path extending from a pump to a power cylinder, a reaction path connected to a hydraulic reaction chamber, and a discharge path connected to a tank are open to be spaced apart from each other by predetermined distances along an axis of said valve; a spool slidably arranged in aid valve hole and having land portions so as to change connecting states of said main pump oil supply path, said reaction path, and said discharge path; and biasing means for always biasing said spool in one direction, wherein a subpump oil supply path for supplying a fluid from a subpump whose delivery pressure is changed in response to a vehicle speed is connected to an end of said spool which is biased by said biasing means, said spool is driven against said biasing means by supplying a pressure corresponding to vehicle speed, hydraulic pressure branching from said main hydraulic path in accordance with said spool displacement is decreased by variable restrictors formed in said spool and supplied to said hydraulic reaction chamber, and a portion of said hydraulic pressure is supplied to a chamber located between said spool and said valve hole, thereby controlling hydraulic reaction pressure by displacing said spool in the direction against said pressure corresponding to said vehicle speed, wherein said valve hole has an annular groove and said spool includes four land portions, said four land portions are located in an order of first, second, third and fourth land portions from a chamber to which said subpump oil supply path is connected, said first land portion and said second land portion devine a chamber that is in fluid communication with said hydraulic reaction chamber, said main pump oil supply path is located between said second land portion and said third land portion, said discharge path is located between said third land portion and said fourth land portion, said biasing means for biasing said spool normally in one direction is located outside said fourth land portion, and two restrictors are formed at both sides of said third land portion corresponding to said annular groove which is in fluid communication with said reaction path, thereby controlling hydraulic reaction pressure by changing said restrictors in accordance with pressure corresponding to said vehicle speed, and wherein said first land portion on a subpump oil supply path side has an annular path which communicates with said discharge path through an escape path formed in said spool.

8. An apparatus according to claim 7, wherein a passage which communicates with said annular groove is connected to said chamber to which a pressure to said hydraulic reaction chamber is supplied, thereby controlling hydraulic reaction force to achieve a feedback operation on the basis of hydraulic reaction pressure supplied to said chamber.

9. An apparatus according to claim 8, wherein said first land portion at the side of said subpump oil supply path has a diameter larger than that of any other land portions.

* * * * *

UNITED STATES PATENT AND TRADEMARK OFFICE
CERTIFICATE OF CORRECTION

PATENT NO. : 5,158,149

DATED : October 20, 1992

INVENTOR(S) : Emori et al

It is certified that error appears in the above-identified patent and that said Letters Patent is hereby corrected as shown below:

In column 1 at line 26 replace "system arc" with --system are--;

In column 2 at line 18 replace "solving al" with --solving all--;

In column 4 at line 35 and at line 43 replace "valve hold 13" with --valve hole 13--;

In column 5 at line 50 replace "against tho" with --against the--;

In column 6 at line 30 replace "force s a fluid" with --force is a fluid--;

UNITED STATES PATENT AND TRADEMARK OFFICE
CERTIFICATE OF CORRECTION

PATENT NO. : 5,188,149
DATED : October 20, 1992
INVENTOR(S) : Emori et al

It is certified that error appears in the above-indentified patent and that said Letters Patent is hereby corrected as shown below:

In column 9 at line 27 replace "arranged in aid valve" with --arranged in said valve--; in column 10 at line 12 replace "portion device a chamber" with -- portion define a chamber--.

Signed and Sealed this

Third Day of October, 1995

Attest:

BRUCE LEHMAN

*Attesting Officer*  *Commissioner of Patents and Trademarks*